United States Patent [19]

Klendworth et al.

[11] Patent Number: 5,001,204
[45] Date of Patent: Mar. 19, 1991

[54] ALUMINA PHOSPHATED WITH PARTIAL ESTER

[75] Inventors: Douglas D. Klendworth, Morris, Ill.; Max P. McDaniel, Bartlesville, Okla.

[73] Assignee: Phillips Petroleum Company, Bartlesville, Okla.

[21] Appl. No.: 557,424

[22] Filed: Jul. 27, 1990

Related U.S. Application Data

[62] Division of Ser. No. 75,457, Jul. 20, 1987, Pat. No. 4,960,748.

[51] Int. Cl.$^5$ .......................... C08F 4/24; C08F 10/00
[52] U.S. Cl. ..................................... 526/106; 526/105; 526/129; 526/145
[58] Field of Search ................. 526/105, 106, 145, 130

[56] References Cited

U.S. PATENT DOCUMENTS

| | | | |
|---|---|---|---|
| 4,364,840 | 12/1982 | McDaniel et al. | 252/430 |
| 4,397,765 | 8/1983 | McDaniel | 252/430 |
| 4,444,963 | 4/1984 | McDaniel et al. | 526/100 |
| 4,536,489 | 8/1985 | Speca et al. | 502/162 |
| 4,629,717 | 12/1986 | Tai-Hsiang Chao | 502/208 |
| 4,640,964 | 2/1987 | Johnson et al. | 526/134 |
| 4,788,171 | 11/1988 | Klendworth | 502/155 |

*Primary Examiner*—Edward J. Smith
*Attorney, Agent, or Firm*—Lynda S. Jolly

[57] ABSTRACT

An alumina-containing material is phosphated with mono- and dialkylphosphate esters. These partial phosphate esters are produced by a solvolysis reaction of a phosphorus compound and an alcohol. The phosphated alumina-containing material, when combined with a transition metal, such as chromium, can be used as a polymerization catalyst system to polymerize mono-1-olefins.

27 Claims, No Drawings

ALUMINA PHOSPHATED WITH PARTIAL ESTER

This application is a division of application Ser. No. 07/075,457, filed July 20, 1987, now U.S. Pat. No. 4,960,748.

BACKGROUND OF THE INVENTION

This invention relates to phosphated supports for chromium containing olefin polymerization catalysts. This invention also relates to a process to polymerize olefins.

Supported chromium oxide catalyst systems can be used to prepare olefin polymers in a hydrocarbon solution to give a product having excellent characteristics from many standpoints. Supported chromium oxide catalyst systems can also be used to prepare olefin polymers in a slurry system wherein the polymer is produced in the form of small particles of solid material suspended in a diluent. This process, frequently referred to as a particle-form process, has the advantage of being less complex. However, certain control operations which are easily carried out in the solution process are considerably more difficult in the particle-form process. For instance, in the solution process, control of the polymer molecular weight can be effected by changing the temperature, with lower molecular weight (higher melt flow) being obtained at the higher temperature. However, in the slurry process, this technique is inherently limited since any efforts to increase the melt flow to any appreciable extent by increasing temperature would cause the polymer to go into solution and thus destroy the slurry or particle form process. Also, it is frequently desired to have a polymer with a broader molecular weight distribution than is normally obtained in the slurry or particle-form process in order to facilitate blow molding of the olefin polymer.

It is known in the art that the activity of such chromium oxide catalyst systems can be improved by treating the support with phosphorus-containing compounds. However, the resultant catalyst system usually tends to contain less phosphorus than a theoretical calculation would indicate should have been added. Additionally, it is desired to increase the surface area of such a catalyst system so as to improve potential productivity. Known phosphorus-containing catalyst system are irregularly shaped, i.e. not spherical, making them more difficult to transport and yielding an inferior polymer. It is also desired to have a catalyst system which is easy to manufacture.

SUMMARY OF THE INVENTION

It is an object of this invention to provide a catalyst system capable of giving both a high melt flow and a broad molecular weight distribution olefin polymer.

It is a further object of this invention to provide a catalyst system which produces a high molecular weight olefin polymer and which is especially sensitive to molecular weight control agents, such as hydrogen and/or a cocatalyst, so that a single catalyst can produce a complete spectrum of polymers so far as melt flow is concerned.

It is a further object of this invention to provide a catalyst system suitable for use in slurry polymerization systems.

It is a further object of this invention to provide a catalyst system capable of giving a polymer suitable for blow molding, film and other applications requiring a moderate to relatively high melt flow and at least a fairly broad molecular weight distribution. It is an object of this invention to provide a catalyst system which retains nearly all of the phosphorus actually added.

It is a further object of this invention to provide a catalyst system wherein the phosphorus-containing support has an increased surface area.

It is a further object of this invention to produce a spherically shaped catalyst system.

It is yet a further object of this invention to produce a catalyst system wherein the phosphating agent and chromium compound can be added simultaneously.

It is yet another object of this invention to provide an improved process for the polymerization of olefins.

In accordance with this invention, an alumina-containing support for a chromium-containing olefin polymerization catalyst system is phosphated with a partial phosphate ester.

DESCRIPTION OF THE PREFERRED EMBODIMENTS

Support

The support of the catalyst of this invention is a phosphated alumina-containing material.

The starting alumina-containing material can contain any alumina convertible at least in part on thermal dehydroxylation to gamma alumina. Preferably, it is boehmite alumina. It may be desirable in some instances to prepare the alumina-containing support in the presence of about 1 to about 30 mole percent of a boron compound, such as boric acid, based on the moles of alumina. Other metal oxides, such as boria, magnesia, thoria, titania, zirconia, or mixtures thereof, can be present without adverse effects. Other ingredients which do not adversely affect the catalyst, or which are present to produce some unrelated result, can also be present, so long as the support is at least 50 weight percent alumina. The alumina-containing material can also contain other ingredients which do not adversely affect the quality of the final catalyst, such as silica, but can be essentially pure alumina.

In the case where a silica-alumina containing material is used for the support, the material generally comprises a range of about 0.01 to about 50 weight percent silica. Preferably, the silica will comprise about 0.05 to about 25 weight percent and a range of about 0.1 to about 10 weight percent silica is most preferred for best control of the resultant polymer. The pore volume of the silica-alumina is the range of about 0.5 to about 2.5 milliliters per gram (ml/g), preferably in the range of about 1 to about 1 ml/g for greater durability. The surface area of the silica-alumina is in the range of about 100 to about 500 square meters per gram ($M^2/g$), preferably in the range of about 200 to about 400 $m^2/g$, and most preferably in the range of about 250 to about 350 $m^2/g$, for easier phosphate and catalyst loading, improved activity, and greater durability.

Prior to treatment with a phosphating agent, it is preferred that the alumina-containing support be calcined at a temperature in the range of about 450° to about 900° C., preferably at about 600° to about 800° C., for a time of about one minute to about 48 hours, preferably about 0.5 to about 10 hours. The calcining can be carried out in an oxidizing, inert, or reducing atmosphere; the principal purpose of the atmosphere is to sweep away moisture.

The term "phosphated" is meant to describe the alumina-containing support treated with a phosphorus compound as described herein and not necessarily to means that phosphate groups are attached to the alumina-containing support. Probably any reaction with the alumina-containing support takes place on activation. The terms "phosphate treatment" and "phosphating" are meant to refer broadly to the phosphorus treatment and not to indicate that the treating agent is a phosphate; although, of course, on activation the phosphorus will be converted to a phosphate.

The phosphating agent used to prepare a partial phosphate ester, is dissolved in alcohol and can be any source of phosphate ions. Preferably, anhydrous phosphorus pentoxide, $P_2O_5$, also designated as $P_4O_{10}$, is the source of phosphate ions; although $P_2O_4$ and $P_2O_3$, also designated as $P_4O_6$, can be used as the source of phosphate ions. The alcohol can be any ROH compound, wherein R is any alkyl groups which comprises from one to four carbon atoms. Preferred alcohols include, but are not limited to, methanol, ethanol, propanol, isopropanol, 1-butanol, 2-butanol, iso-butanol, and mixtures thereof. The solvolysis reaction of anhydrous phosphorous pentoxide in alcohol yields primarily a mixture of mono- and dialkyl phosphate esters, as the following reaction scheme illustrates:

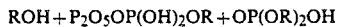

$$ROH + P_2O_5 \rightarrow OP(OH)_2OR + OP(OR)_2OH$$

Preferably, the alumina-containing support is phosphated by a modified incipient wetness technique. It is believed that this technique phosphates only the surface of the alumina-containing support. The modified incipient wetness technique requires a minimum amount of solvent used with the phosphate ions during the phosphating treatment. Initially, the desired phosphorus to aluminum mole ratio must be determined. Then, the moles of phosphorus to be added as the solute is calculated; finally, the grams of phosphating agent to be used is calculated. The volume of alcohol to be used as the solvent is determined based on the pore volume of the alumina-containing support to be phosphated. The known pore volume of the alumina-containing support is multiplied by the grams of alumina-containing support to be phosphated, to give the minimum volume of alcohol in which to dissolve the phosphating agent.

The volume of alcohol used can be increased slightly, so that upon the addition of the phosphorus-alcohol solution to the alumina-containing support, the support looks wet, but not a slurry. The incipient wetness technique, hence, does not overly saturate the alumina-containing support. After treatment, the unreacted alcohol is removed by drying, for instance, by gentle heating in a vacuum, or by means of gentle heating in the presence of an anhydrous gaseous stream, such as nitrogen or air.

The phosphorus component is added in an amount in the range of about 0.1 to about 20, preferably about 1 to about 10, mole percent of the phosphorus compound incorporated, based on the total moles of alumina-containing support. Based on surface area, the phosphorus compound from the phosphating agent is present in an amount sufficient to give about 0.005 to about 1, preferably about 0.01 to about 0.5 milligrams of phosphorus per square meter (mg $P/m^2$) of the alumina-containing material surface as measured by BET nitrogen adsorption.

In compositions containing chromium, the phosphorus component, based on the chromium content, is utilized in an amount to give about 1 to about 5 atoms percent of phosphorus incorporated. This is about 1 to about 5 atoms of phosphorus per atoms of chromium, particularly when the preferred 1 weight percent chromium, based on the weight of alumina-containing support, is used. Generally, the ratio of atoms of phosphorus per atom of transition metal, such as chromium, will be in the range of about 0.1 to about 20, preferably about 1 to about 10.

Viewed another way, the phosphating agent is used in a sufficient amount to give a phosphorus to total aluminum atom ratio of about 0.02 to about 1:1, preferably about 0.05:1 to about 0.6:1 for most efficient use of the phosphating agent.

Since the phosphating treatment of this invention phosphates only the surface of the aluminum-containing material, the phosphorus to aluminum atom ratio can also be expressed in terms of a phosphorus to surface aluminum atoms ratio. The phosphorus to surface aluminum atom ratio is about 0.2:1 to about 2:1, preferably about 0.6:1 to about 0.9:1 for most efficient use of the phosphating agent.

In practice, however, it is possible to use as much phosphating agent as desired with the excess simply being washed off after the phosphating treatment is complete. The phosphating treatment is generally carried out at a temperature in the range of about 15° to about 500° C., preferably in the range of about room temperature to about the boiling point of the solvent of the phosphate solution used. The contact time between the phosphorus-alcohol solution and the alumina-containing support is in the range of about 1 minute to about 2 hours, preferably in the range of about 2 minutes to about 30 minutes. These temperature and time parameters produce the appropriately phosphated alumina-containing support.

The calcined and phosphated alumina-containing support of this invention has wide applicability in utilities where refractory catalyst supports are used. The calcined and phosphated alumina-containing support of this invention can also be used in other utilities known for alumina, such as fillers. It has also been found to be an excellent isomerization catalyst without any other catalytic ingredient being deposited thereon. However, it is of primary utility as a chromium oxide catalyst support for olefin polymerization.

It has been found from work with aluminum phosphate, that the best polymer properties, such as high melt index, high density and good environmental stress crack resistance (ESCR) are obtained using a high phosphorus to total aluminum ratio, i.e., about 0.8. However, surface area and pore volume are optimum at a lower phosphorus to total aluminum ratio, i.e. about 0.4 because of sintering at the higher ratios. This invention makes it possible to have the good physical stability of a low P/Al ratio support since the bulk of the support is alumina and still have the good catalytic effect of the high ratio because of the high content of phosphorus on the surface. In addition, the invention allows achieving a high productivity with a relatively inexpensive alumina-containing support, such as silica-alumina.

The invention takes advantage of the fact that some properties, such as surface area, are favored by high alumina content whereas others, such as melt index potential, are favored by phosphate content. By imparting a phosphate layer on the surface of the silica-alumina, it is possible to take advantage of both trends, and by calcining prior to the phosphating, it is possible for reasons which are not fully understood, to drastically improve the activity and let index potential of the catalyst system.

Catalyst

Catalyst systems employed in the practice of this invention comprise a phosphated predominately alumina support, prepared as described above, and a transition metal compound, such as chromium. Other suitable, but less preferred, transition metal compounds are vanadium and titanium compounds. It should be recognized, however, that catalyst systems of the invention can be used in conjunction with additional polymerization components which do not adversely affect the catalyst performance, such as a cocatalyst.

The transition metal compound can be introduced anytime prior to activation of the catalyst system. Where the transition metal compound is chromium, the chromium compound can be any chromium compound in, or convertible to, the hexavalent state which is soluble in any non-aqueous solvent. The catalyst system contains chromium in an amount generally within the range of 0.001 to about 10, preferably about 0.1 to about 5, more preferably about 1 weight percent, based on the weight of the dried, phosphated alumina-containing support.

Catalyst concentrations can be such that the supported catalyst content ranges from 0.001 to about 1 weight percent based on the weight of the reactor contents.

The chromium compound can be incorporated as known in the art. For instance, a hydrocarbon solution of a material such as tertiary butylchromate can be used to impregnate the phosphated alumina-containing support or chromium can be added along with phosphorus-alcohol solution to the alumina-containing support. The non-aqueous, hydrocarbon solvent for the chromium compound can be any common solvent, such as toluene, benzene, heptane, hexane, etc. For ease of catalyst system preparation, the chromium compound is dissolved in an alcohol having one to four carbon atoms, such as methanol, ethanol, propanol, isopropanol, 1-butanol, 2-butanol, isobutanol, and mixtures thereof.

Alternatively, the support can be activated without a transition metal component being present, and thereafter, a chromium component such as an organo-chromium compound, chromocene, for instance, can be anhydrously impregnated onto the support and the solvent gently removed to give an active catalyst.

The chromium-alcohol and phosphorus-alcohol solutions can be combined and added to the alumina-containing support simultaneously. However, in general, it is preferred to prepare the phosphated alumina-containing support prior to adding the chromium component. Most preferably, the phosphated alumina-containing support is heated prior to addition of the chromium. Calcination of the phosphated, alumina-containing material is in an oxygen-containing atmosphere, at a temperature in the range of about 500° C. to about 1000° C. for a time in the range of about 1 minute to about 48 hours, prior to contacting a transition metal compound, such as chromium. Thus, in this preferred embodiment, the support is heated twice, once after the phosphorus is added and then again after the chromium compound is added. In all aspects of this catalyst embodiment of the invention, the catalyst system of the phosphated silica-alumina support and the chromium compound must be activated, i.e., heated, to activate the catalyst for polymerization.

The activation of the chromium-containing systems can be carried out at a lower temperature than is generally required for activating predominately silica based chromium catalyst systems. Temperatures in the range of about 150° to about 900° C., preferably about 300° to about 800° C., more preferably about 500° to about 750° C. are suitable. The activating ambient can be any oxidizing ambient but for reasons of convenience is generally air. Times of about one minute to about 48 hours are preferred, with times of about 0.5 to about 10 hours more preferred. This activation can be carried out at atmospheric pressures, but a vacuum is preferred to maintain the structural integrity of the catalyst system. Vacuum drying helps prevent combustion of the solvent to form water which has pernicious effects on the catalyst.

The catalyst systems of this invention, comprising chromium on a phosphated alumina-containing support, can be subjected to reduction and then reoxidation as disclosed in McDaniel, U.S. Pat. No. 4,182,815 (Jan. 8, 1980), disclosure of which is hereby incorporated by reference, if desired.

Cocatalysts

The catalysts of this invention can be used in conjunction with a cocatalyst if desired. Suitable cocatalysts include aluminum and boron alkyls, which if used, increase the melt flow characteristics of the resultant polymer. The most preferred boron compounds are trihydrocarbyl boron compound, particularly tri-n-butylborane, tripropylborane, and triethylborane (TEB). Other suitable boron compounds include trialkyl boron compounds broadly, particularly those having alkyl groups of about 1 to about 12 carbon atoms, preferably, about 2 to about 5 carbon atoms; triaryl boron compounds such as triphenylborane; boron alkoxides such as $B(C_2H_5)_2OC_2H_5$; and halogenatedalkyl boron compounds such as $BC_2H_5Cl_2$. Suitable aluminum alkyls include $R'_3Al$, and $R'AlX_2$ compounds where R' is a hydrocarbyl radical with about 1 to about 12 carbon atoms and X is a halogen, preferably chlorine. Triethylaluminum and diethylaluminum chloride are particularly suitable.

The cocatalyst is used in an amount within the range of about 0.1 to about 25, preferably about 0.25 to about 10, parts per million based on the solvent or diluent in systems employing a solvent or diluent and based on total reactor contents in systems not employing a solvent or diluent. Based on the chromium in the catalyst, they are used in an amount so as to give about 0.05 to about 5, preferably about 0.05 to about 3 times as much boron by weight as chromium by weight. Based on atoms of boron per atoms of chromium, the amount of cocatalyst used will give about 0.5 to about 14, preferably about 1.5 to about 10, atoms of boron (or aluminum) per atom of chromium. The boron cocatalysts give higher density olefin polymers than aluminum cocatalyst or catalyst systems with no cocatalyst.

The cocatalyst can be either premixed with the catalyst system or introduced into the reactor as a separate stream, the latter being the preferred procedure for ease of catalyst system preparation and handling.

Of course, the final catalyst can be used with, or contain, other ingredients which do not adversely affect its performance, as for example other cocatalyst, antistatic aids in the polymerization zone, and other conventional ingredients.

Reactants

Reactants applicable for use with the catalysts and processes of this invention are olefinic compounds which can polymerize, i.e., react, with other olefinic compounds. The catalysts of the invention can be used to polymerize at least one mono-1-olefin having 2 to about 8 carbon atoms per molecule. Exemplary compounds include, but are not limited to, ethylene, propylene, 1-butene, 1-pentene, 1-hexene, and 1-octene.

This invention is of particular applicability in producing ethylene homopolymers and copolymers from mixtures of ethylene and about 0.5 to about 20 mole percent of one or more comonomers selected from 1-olefins having about 3 to about 8 carbon atoms per molecule. Exemplary comonomers include, but are not limited to, aliphatic 1-olefins, such as propylene, 1-butene, 1-pentene, 1-hexene, 1-octene and other higher olefins and conjugated or non-conjugated diolefins such as 1,3-butadiene, isoprene, piperylene, 2,3-dimethyl-1,3-butadiene, 1,4-pentadiene, 1,7-hexadiene, and other such diolefins and mixtures thereof. Ethylene copolymers preferably constitute at least about 90, preferably about 97 to about 99.6 weight percent polymerized ethylene units. Propylene, 1-butene, 1-pentene, 1-hexene and 1-octene are especially preferred comonomers for use with ethylene.

The presence of comonomer has a tendency to increase melt flow more than would be expected. Hence, the use of only a small amount of comonomer, say 0.001 to 0.3, preferably 0.01 to 0.1, mole percent in the feed can be used to give a polymer which is essentially a homopolymer but which has increased melt flow.

Reaction Conditions

The polymers can be prepared from the catalyst system of this invention by solution polymerization, slurry polymerization, and gas phase polymerization techniques using conventional equipment and contacting processes. Contacting of the monomer or monomers with the catalyst system can be effected by any manner known in the art of solid catalysts. One convenient method is to suspend the catalyst system in the organic medium and to agitate the mixture to maintain the catalyst system in suspension throughout the polymerization process. Other known contacting methods such as fluidized bed, gravitating bed, and fixed bed can also be employed. Catalyst systems form process as disclosed in Witt, U.S. Pat. No. 3,724,063 the disclosure of which is hereby incorporated by reference.

The catalyst systems of this invention are particularly suitable for use in slurry polymerizations. The slurry process is generally carried out in an inert diluent (medium), such as a paraffin, cycloparaffin or aromatic hydrocarbon. For predominantly ethylene polymers, a temperature range of about 66° to about 110° C. is employed.

The medium and temperature are selected such that the polymer is produced as solid particles and is recovered in that form. Pressures in the particle form process can vary from about 110 to about 700 psia (0.76–4.8 MPa) or higher. The catalyst system is kept in suspension and is contacted with the amount or monomers at sufficient pressure to maintain the medium and at least a portion of the monomer or monomers in the liquid phase.

Generally in slurry polymerization of ethylene homopolymer and predominantly ethylene copolymer systems, the feasible temperature range is about 93° to about 110° C. Commercial systems are operated as close to the maximum as possible, i.e., about 107°±3° C., in order to obtain the highest possible melt index without the polymer going into solution. Catalyst systems of this invention allow operating at the low end to this range, i.e., about 96°±3° C., in systems normally employing a temperature of about 107° C. The lower temperature gives a relatively higher monomer partial pressure, thus giving higher activity.

Hydrogen can be added to the reactor to control the molecular weight of the polymer. Generally, hydrogen concentration is inversely proportional to the molecular weight of the polymer, i.e., increasing hydrogen pressure decreases the polymer molecular weight. In prior art, hydrogen is generally used at pressures up to about 120 psia (0.8 MPa), preferably within the range of about 20 to about 70 psia (about 0.01 to about 0.48 MPa). Similar amounts can be used in accordance with this invention although smaller amounts are sometimes preferred because of the sensitivity of this catalyst system to the effects of hydrogen.

EXAMPLES

EXAMPLE I

In this example, silica-alumina supports were spray-dried silica-aluminas having a boehmite structure. These silica-aluminas are sold by Ketjen Catalysts, a division of Akzo Chemie, under the trademark Ketjen L, which has about 5 weight percent silica. The invention runs were calcined at 600°–700° C. in air before being given a phosphating treatment. This calcination dehydroxylates the alumina converting it from boehmite structure to the gamma structure. The phosphating treatment was carried out by impregnating the silica-alumina with an alcoholic solution of the phosphorus compound listed. An amount of alcoholic solution was used which was just sufficient to impart incipient wetness to the support, this generally being about 2.5 milliliters of alcoholic solution per gram of support (cc/g).

The phosphorus to total aluminum ratio of the catalyst was adjusted by varying the amount of phosphorus compound used. Generally, 0.5 to 3 grams/40 cc of alcohol was used. The phosphated silica-alumina was calcined in air at about 700° C. and then analyzed for phosphorus content.

The data in Table I shows the variation between the theoretically calculated and the actually analyzed amount of phosphorus anhydrously loaded onto a pre-calcined silica-alumina.

TABLE I

| Run No. | Phosphorus Compound | (Total) P/Al Mole Ratio | |
|---|---|---|---|
| | | Calculated | Analyzed |
| 101 | $OP(OC_2H_5)_3$ | 0.20 | 0.08 |
| 102 | $OP(OC_2H_5)_3$ | 0.28 | 0.10 |
| 103 | $OP(OC_4H_5)$ | 0.20 | 0.15 |
| 104 | $OP(OC_4H_5)$ | 0.25 | 0.20 |
| 105 | $P_2O_5/i\text{-PrOH}$ | 0.10 | 0.12 |
| 106 | $P_2O_5/i\text{-PrOH}$ | 0.30 | 0.32 |
| 107 | $H_3PO_4$ | 0.16 | 0.17 |

Runs 101 through 104 were trialkylphosphate esters. The decrease in the P/Al (total) ratio, from the calculated ratio to the analyzed ratio, indicates that some of the phosphorus compound volatilizes off the surface of the alumina during calcination. Runs 105 and 106, wherein $P_2O_5$ and isopropyl alcohol from mono- and dialkylphosphate esters (i.e., partial esters), show relatively good agreement in both P/Al (total) ratios. When phosphoric acid is used as the phosphating agent, run 107, there is also good agreement between the P/Al ratios.

EXAMPLE II

Each run in Example II was conducted in a clean, dry, air-free, stirred, stainless steel reactor of about 2-liter capacity. About 600 grams of isobutane was used in each run as diluent with a catalyst charge ranging from about 0.05 to about 0.1 grams. The reactor and its contents were heated to the desired operating temperature, about 95° C., and ethylene was pressured in to give about 565 psia (3.9 MPa). Triethylborane (TEB) was added to the reactor to give a concentration of about 8 parts per million TEB. The run was started immediately because the catalysts, unlike the corresponding chromium oxide on silica catalysts, do not have an induction period. Ethylene pressure was maintained during the run by supplying additional ethylene as required from a reservoir.

Each run was terminated by stopping the ethylene flow and venting the gaseous reactor contents to a flare line for disposal. The productivity which is expressed in terms of grams polyethylene per gram catalyst.

The data in Table II demonstrate the effect phosphorus loading has on surface area, productivity, and the resultant polymer high load melt index (HLMI). The silica-alumina, Ketjen L, was calcined both before and after treatment with the phosphorus and chromium compounds. The phosphating treatment of the invention (runs 201–210) was carried out by impregnating the silica alumina with an alcoholic solution of phosphorus pentoxide and chromium acetate. The support of the control runs was phosphated with an alcoholic solution of phosphoric acid and chromium acetate. A sufficient amount of the alcoholic solution was used to impart incipient wetness to the support. Thus, about 2.5 milliliters of alcoholic solution was added for each gram of support.

TABLE II

| Run No. | Phosphating Agent | P/Al Mole Ratio | Surface Area, m²g | Activity[1] | HLMI[2] |
|---|---|---|---|---|---|
| 201 | $P_2O_5$ | 0.1218 | 278 | — | 0 |
| 202 | $P_2O_5$ | 0.1222 | 279 | 2944 | 2.98 |
| 203 | $P_2O_5$ | 0.1599 | 275 | 5727 | — |
| 204 | $P_2O_5$ | 0.1761 | 290 | 4038 | 6.93 |
| 205 | $P_2O_5$ | 0.2100 | 267 | 2783 | 9.5 |
| 206 | $P_2O_5$ | 0.2193 | 283 | 2903 | 12.5 |
| 207 | $P_2O_5$ | 0.2425 | 282 | 3563 | — |
| 208 | $P_2O_5$ | 0.2656 | 243 | 2322 | 30.5 |
| 209 | $P_2O_5$ | 0.3214 | 268 | 2491 | 61.3 |
| 210 | $P_2O_5$ | 0.39 | 242 | 1544 | 44 |
| 211 | $H_3PO_4$ | 0.1 | 275 | 1276 | — |
| 212 | $H_3PO_4$ | 0.1092 | 303 | 2756 | — |
| 213 | $H_3PO_4$ | 0.1134 | 270 | 3252 | 6.7 |
| 214 | $H_3PO_4$ | 0.15 | — | 3160 | 19.8 |
| 215 | $H_3PO_4$ | 0.1710 | 256 | 2641 | 45.6 |
| 216 | $H_3PO_4$ | 0.1741 | 237 | 2257 | 9.4 |
| 217 | $H_3PO_4$ | 0.2 | 202 | 1178 | — |
| 218 | $H_3PO_4$ | 0.2122 | 222 | 1740 | 7.7 |
| 219 | $H_3PO_4$ | 0.2166 | 211 | 3225 | 82.8 |
| 220 | $H_3PO_4$ | 0.2402 | 198 | 3319 | 83.3 |

[1] grams of polymer produced per gram of catalyst in 30 minutes (g/g/30).
[2] ASTM D1238, Condition F.

Comparison of the $P_2O_5$ data to the $H_3PO_4$ data shows that, in general, the surface area of the silica-alumina phosphated with $P_2O_5$-alcohol (partial esters) is greater than the $H_3PO_4$ phosphated silica-alumina. The corresponding activity of the $P_2O_5$ phosphated silica-alumina catalyst is also generally greater than the $H_3PO_4$ phosphated silica-alumina. The HLMI data reveals that $P_2O_5$ phosphated silica-alumina has lower high load melt indices than the $H_3PO_4$ phosphated silica-alumina. Thus, the $P_2O_5$/ROH treatment allows more phosphorus to be added to the silica-alumina with less effect on the HLMI and surface area and a greater effect on activity than the $H_3PO_4$/ROH system.

While this invention has been described in detail for the purpose of illustration, it is not to be construed as limited thereby but is intended to cover all changes and modifications within the spirit and scope thereof.

That which is claimed is:

1. A polymerization process comprising contacting at least 1 mono-1-olefin having 2 to 8 carbon atoms per molecule with a catalyst system produced by;
   (a) heating an alumina-containing material at a temperature in the range of about 450° to about 900° C., for a time in the range of about 1 minute to about 48 hours;
   (b) treating the thus heated material with an alcohol solution of partial phosphate ester to give a phosphated alumina-containing material, wherein said partial phosphate ester comprises a mixture of mono- and dialkyl phosphate esters produced by combining phosphorus esters produced by combining phosphorus pentoxide with an alcohol; and
   (c) combining the phosphated alumina-containing material with a chromium compound.

2. A process according to claim 1 wherein said olefin is selected from the group consisting of ethylene, propylene, 1-butene, 1-pentene, 1-hexene, and 1-octene.

3. A process according to claim 2 wherein said olefin is predominantly ethylene.

4. A process according to claim 3 wherein a comonomer having from about 3 to about 8 carbon atoms per molecule is copolymerized with ethylene to form an ethylene copolymer.

5. A process according to claim 4 wherein said comonomer is selected from the group consisting of propylene, 1-butene, 1-hexene, and 1-octene.

6. A process according to claim 4 wherein said ethylene copolymer constitutes at least about 90 weight percent polymerized ethylene units.

7. A process according to claim 1 wherein said polymerization is carried out at a temperature with the range of about 93° to about 110° C.

8. A process according to claim 1 wherein said alumina-containing material contains about 0.01 to about 50 weight percent silica.

9. A process according to claim 8 wherein said alumina-containing material has a surface area in the range of about 100 to about 500 m²/g.

10. A process according to claim 8 wherein said alumina-containing material has a pore volume in the range of about 0.5 ml/g to about 2.5 ml/g.

11. A process according to claim 1 wherein said alcohol is selected from the group consisting of methanol, isopropanol, 1-butanol, 2-isobutanol and mixtures of two or more thereof.

12. A process according to claim 1 wherein said treatment with said partial phosphate ester is sufficient to give a range of about 0.1 to about 20 mole percent of phosphorus based on the total moles of said alumina-containing material.

13. A process according to claim 1 wherein said treatment with said partial phosphate ester is sufficient to give a range of about 0.01 to about 0.5 milligrams phosphorus per square meter of surface area of said alumina-containing material.

14. A process according to claim 1 wherein said chromium compound is selected from the group consisting of chromium trioxide, chromium acetate, chromium nitrate and mixtures of two or more thereof; and wherein said chromium compound is present in the range of about 0.1 to about 5 weight percent, based on the weight of said phosphated alumina-containing material.

15. A process according to claim 1 wherein said chromium compound is combined with alcohol prior to contacting said phosphated alumina-containing material.

16. A process according to claim 1 further comprising calcining said phosphated alumina-containing material in an oxygen-containing atmosphere, at a temperature in the range of about 500° to about 1000° C., for a time in the range of about 1 minute to about 48 hours, prior to contacting said chromium metal compound.

17. A process according to claim 1 further comprising dissolving said partial phosphate ester and said chromium compound separately in alcohol, combining the two solutions, and then adding said combined solution to said alumina-containing material.

18. A process according to claim 1 wherein said catalyst system comprising said chromium compound on said phosphated alumina-containing material is heated in an elevated temperature in an oxygen-containing atmosphere.

19. A process according to claim 1 further comprising combining said catalyst system with an organo-metal cocatalyst.

20. A polymerization process comprising contacting at least one mono-1-olefin having 2 to 8 carbon atoms per molecule with a catalyst system produced by;
 (a) calcining silica-alumina, comprising from about 0.1 to about 50 weight percent silica, at a temperature in the range of about 450° to about 900° C., for a time in the range of about 1 minute to about 48 hours;
 (b) dissolving phosphorus pentoxide in alcohol;
 (c) dissolving a chromium compound in alcohol;
 (d) combining the solutions of (b) and (c);
 (e) treating the calcined silica-alumina of (a) with a solution of (d); and
 (f) calcining the compound of (e) in an oxidizing ambient at a temperature in the range of about 150° to about 900° for a time in the range of about 1 minute to about 48 hours.

21. A process according to claim 20 wherein said olefin is selected from the group consisting of ethylene, propylene, 1-pentene, 1-hexene, and 1-octene.

22. A process according to claim 20 wherein said olefin is predominantly ethylene.

23. A process according to claim 22 wherein a comonomer having from about 3 to about 8 carbon atoms per molecule is copolymerized with ethylene to form an ethylene copolymer.

24. A process according to claim 23 wherein said comonomer is selected from the group consisting of propylene, 1-butene, 1-hexene, and 1-octene.

25. A process according to claim 23 wherein said ethylene copolymer constitutes at least about 90 weight percent polymerized ethylene units.

26. A process according to claim 1 wherein a polymer is recovered.

27. A process according to claim 20 wherein a polymer is recovered.

* * * * *